Feb. 19, 1952     F. C. EHRENREICH ET AL     2,586,152
TWIN URN FOR MAKING COFFEE AND THE LIKE
Filed March 28, 1950     2 SHEETS—SHEET 1
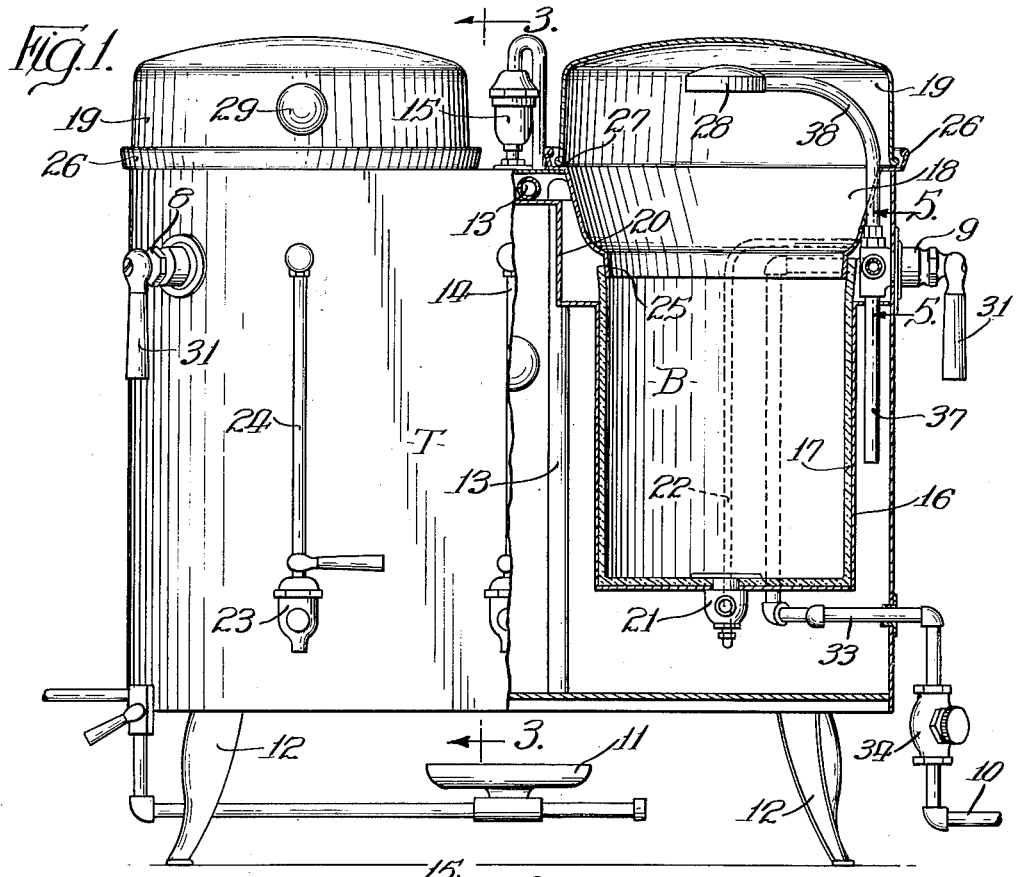
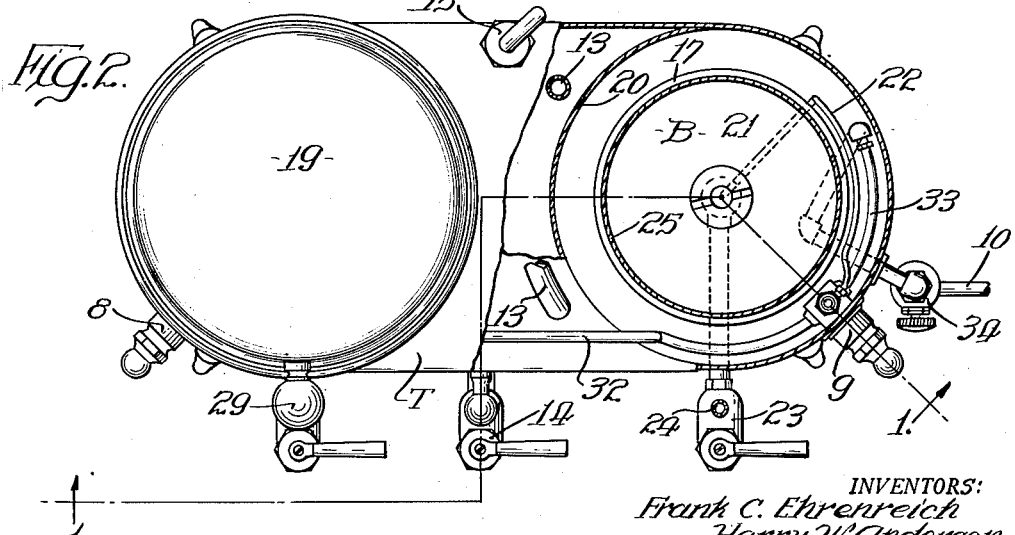
INVENTORS:
Frank C. Ehrenreich
Harry W. Anderson
BY Blenning & Blenning
Attys.

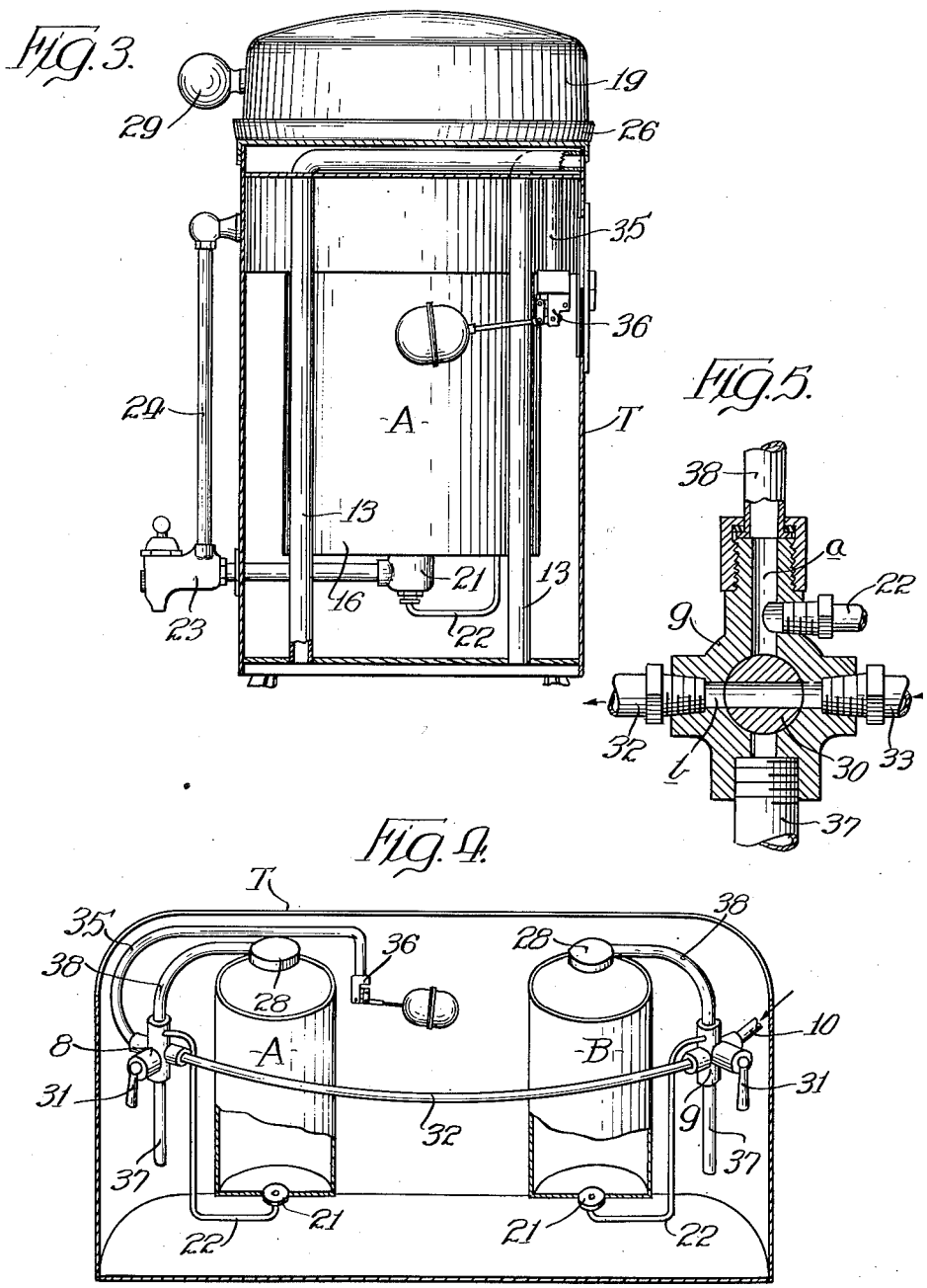

Patented Feb. 19, 1952

2,586,152

UNITED STATES PATENT OFFICE 2,586,152

TWIN URN FOR MAKING COFFEE AND THE LIKE

Frank C. Ehrenreich and Harry W. Anderson, Chicago, Ill.

Application March 28, 1950, Serial No. 152,304

1 Claim. (Cl. 99—291)

This invention relates to a twin urn for making coffee and the like. Urns of this kind involve a water heating tank wherein is suspended a pair of urns each supporting a bag containing the ground coffee. Water is heated to the boiling point in the tank and alternatively syphoned into the urns, the beverage being brewed in one of them while it is being drawn from the other.

The admission of water into the tank and the syphoning thereof into the urns is controlled by valves. Present constructions are equipped with a valve for controlling the supply of water to the tank and with separate valves for controlling the syphoning of the hot water into each of the respective urns. These valves have to be separately manipulated to secure the desired results of having coffee brewed in one of the urns as it is being drawn from the other. There is always the possibility that one may forget to turn off the water control valve before opening the syphoning valve to one of the urns, in which event there may be serious trouble.

The main objects of this invention, therefore, are to provide an improved twin urn construction in which a single pair of valves is individually operable to control all operations needed for admitting water into the tank, when required, and syphoning of the heated water into the respective urns, as desired; to provide an improved valve arrangement of this kind which involves the operation of only one of the two valves for admitting a supply of water either to the tank or permitting syphoning thereof to one of the respective urns; to provide an improved valve arrangement of this kind which precludes the possibility of the water supply line being open to the tank when either one of the syphon lines is open; and to provide an improved valve arrangement of this kind which is economical to manufacture, easy to assemble on new or existing equipment, simple to operate, and positive in its results.

In the accompanying drawings:

Figure 1 is a front elevation, partly sectional along line 1—1 of Fig. 2, of a twin urn for making coffee, equipped with an improved valve arrangement embodying this invention;

Fig. 2 is a plan view, partly sectional, of the equipment shown in Fig. 1;

Fig. 3 is a vertical sectional view taken on line 3—3 of Fig. 1;

Fig. 4 is a somewhat diagrammatic perspective view, partly sectional, of the twin urn elsewhere illustrated herein; and Fig. 5 is a detail in section, taken on line 5—5 of Fig. 1.

A twin urn for making coffee, wherewith this improved valve arrangement has been designed for use, comprises a tank T, suspending therein a pair of urns A and B, the supply of hot water to which is controlled by an improved arrangement of valves 8 and 9. Water which is supplied to the tank T through a supply line 10 may be heated by a suitable valve-controlled burner 11 or otherwise.

The tank is of conventional construction. It is preferably made of sheet metal and is horizontally elongated with rounded ends. The tank T is supported by legs 12 on a table or counter. Vent pipes 13, located near the center, extend up through the tank to convey off a part of the heat from the burner 11 and facilitate the heating of the water as the heat passes up through the pipes to the upper back of the tank. The tank may be equipped with the conventional water gage and valve controlled outlet 14 and a steam safety valve 15. The urns A and B are likewise of a conventional construction. Generally, each comprises a shell 16, a lining 17, a frusto-conical top ring 18, and a cover 19.

At their upper ends, the shells 16 are somewhat larger than the main body, as shown at 20, and are secured at the upper portion of the tank T (see Fig. 1). The linings 17 which are usually glass extend a short distance above the upper ends of the main body part of the respective shells 16. The bottom of each shell and the lining therewithin is provided with a fitting 21 for a mixing water connection 22 from the valve 8 or 9, as the case may be, and with a draft faucet 23 on which is mounted the usual gage 24.

Each frusto-conical ring 18 is provided with flanges 25 and 26 at its opposite ends (see Fig. 1). The lower flange 25 telescopes with the upper end of the glass lining 17. The upper flange 26 is flared outwardly to form a ledge 27 which affords support for the ring 18 on the top of the tank T, and also for the cover 19 within and below which is arranged a spray head 28. A coffee bag (not shown) is suitably suspended within the lining 17 in a well-known manner. Each urn cover 19 has cylindrical sides with a convex top, and mounts a suitable knob or handle 29.

Each of the valves 8 and 9 is formed with cross channels $a$ and $b$ (see Fig. 5) extending through its housing and communication through either channel, but only one at a time, is established by a rotatable valve member 30 having a transverse port therethrough, rotation of the valve member being controlled by a handle 31. The valves 8 and 9 are interposed in the water supply line 10, one being arranged adjacent each of the respective urns A and B. The horizontal cross channels $b$ are interconnected by a pipe 32 (see Fig. 4). The vertical channel $a$ for the valve 9 is connected by a pipe 33 to the water supply line 10 which is controlled by a valve 34 (see Fig. 2). The cross channel b for the valve 8 is connected by a pipe 35 leading into the tank and mounting at its inner end a float-controlled inlet valve 36 of standard construction.

The vertical cross channel a of each valve 8 and 9 is connected by a pipe 37 to a point below the normal water line in the tank T and by a pipe 38 to the spray head 28 for the respective urn A or B. The pipes 37 and 38 constitute a syphon whereby hot water is drawn from the tank T into the respective urns A and B. The depth of the end of the pipe 37 in the tank determines the amount of water that will be syphoned into the urns when the valve handles 31 are properly adjusted. The small pipe 22 leads from each of the vertical cross channels a of the valves 8 and 9 to the inlet fittings 21 for the respective urns A and B.

By this arrangement of the cross channel valves 8 and 9 in the water supply line 10, the supply of water to the tank T is controlled by either of these valves, and the syphoning of the hot water into either of the urns A or B is alternately controlled by its respective valve 8 or 9. When either valve 8 or 9 is turned for syphoning water into the respective urn A or B, the supply of water is cut off so that during the syphoning action to either of the urns A or B there is no possibility of a fresh supply of water entering the tank T which, if admitted, would check the syphoning action.

Variations and modifications in the details of the structure and arrangement of the parts may be resorted to within the spirit and coverage of the appended claim.

We claim:

A coffee making device comprising an elongated water heating tank having a float-controlled cold water inlet thereinto, a pair of percolating urns arranged side by side in the tank each equipped with an overhead spray and a valve-controlled coffee draft outlet in the base thereof leading to the front exterior of the tank, a pair of cross-channel valves arranged on the front of the tank each vertically adjacent a different one of the respective draft outlets, with each of the valves having a horizontal channel and a vertical channel, a pipe extending across and within the front of the tank from one valve to the other to afford communication between the horizontal channel in each of the valves, a pipe leading from the opposite end of the horizontal channel in the one valve to the float-controlled water inlet, a pipe connecting the opposite end of the horizontal channel in the other valve with a source of cold water, pipes connecting the vertical channel in each valve with the respective urn spray and with the interior of the tank at a point below the normal float-controlled water level therein, and a rotatable valve member in each of the valves and controlling the channels therein to permit communication when in one position only between the horizontal channels and when in another position only between the vertical channels whereby movement of the rotatable valve member in either valve to a position establishing communication between an urn spray and the interior of the tank prevents communication between the source of cold water and the tank inlet.

FRANK C. EHRENREICH.
HARRY W. ANDERSON.

REFERENCES CITED

The following references are of record in the file of this patent:

UNITED STATES PATENTS

| Number | Name | Date |
|---|---|---|
| 1,706,190 | Shroyer | Mar. 19, 1929 |
| 1,710,218 | Kelly | Apr. 23, 1929 |
| 1,796,518 | Glascock | Mar. 17, 1931 |
| 1,910,614 | Fazan et al. | May 23, 1933 |
| 2,544,836 | Hotvedt | Mar. 13, 1951 |